United States Patent
Kim et al.

(10) Patent No.: US 6,802,352 B2
(45) Date of Patent: Oct. 12, 2004

(54) DEVICE AND METHOD FOR BONDING FRICTION MATERIAL OF CLUTCH PULLEY

(75) Inventors: Kiyeon Kim, Daejeon-si (KR); Bokkyu Choi, Daejeon-si (KR); Jongsu Kim, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 0 days.

(21) Appl. No.: 10/445,653

(22) Filed: May 27, 2003

(65) Prior Publication Data

US 2003/0217800 A1 Nov. 27, 2003

(30) Foreign Application Priority Data

May 27, 2002 (KR) ................................ 10-2002-0029272

(51) Int. Cl.[7] ............................................... B32B 31/20
(52) U.S. Cl. ...................... 156/356; 156/378; 156/379
(58) Field of Search .......................... 156/64, 297, 299, 156/295, 356, 359, 378, 379, 578; 428/66.2; 180/17, 18 A, 73.1, 73.2, 73.31, 218 XL; 427/208; 18/212, 316, 226

(56) References Cited

U.S. PATENT DOCUMENTS

| | | | | |
|---|---|---|---|---|
| 4,821,400 A | * | 4/1989 | Burkhart et al. | ............ 29/527.4 |
| 5,755,355 A | * | 5/1998 | Timmerman et al. | .......... 221/33 |
| 5,810,969 A | * | 9/1998 | Marchisseau et al. | ........ 156/580 |
| 6,500,294 B1 | * | 12/2002 | Honda et al. | ................ 156/265 |
| 2002/0061360 A1 | * | 5/2002 | Marchisseau et al. | ........... 427/8 |

FOREIGN PATENT DOCUMENTS

KR        1999-34484        5/1999

OTHER PUBLICATIONS

Abstract to KR–2001–17630, Mar. 5th, 2001 (in English).

* cited by examiner

Primary Examiner—Melvin C Mayes
Assistant Examiner—George R. Koch, III
(74) Attorney, Agent, or Firm—Fulbright & Jaworski L.L.P.

(57) ABSTRACT

Disclosed is a device and a method for bonding friction material of clutch pulley. The device and method for bonding friction material of clutch pulley can simplify bonding processes by bonding friction material to a clutch pulley of an electromagnetic clutch for a compressor with a liquid phase adhesive, and improve productivity and prevent bonding error of the friction material by automatically inspecting a coated condition of the liquid phase adhesive.

3 Claims, 6 Drawing Sheets

DEVICE AND METHOD FOR BONDING FRICTION MATERIAL OF CLUTCH PULLEY

TECHNICAL FIELD

The present invention relates to a device and a method for bonding friction material of clutch pulley, and more particularly, to a device and a method for bonding friction material of clutch pulley, which can simplify bonding processes by bonding friction material to a clutch pulley of an electromagnetic clutch for a compressor with a liquid phase adhesive, and which can improve productivity and prevent bonding error of the friction material by automatically inspecting a coated condition of the liquid phase adhesive.

BACKGROUND ART

A compressor of an air conditioning device for an automobile is operated by controllably receiving driving power of an engine through an electromagnetic clutch.

The electromagnetic clutch includes a field core assembly supported on a compressor housing, and a hub and disc assembly including a disc absorbed to or separated from the friction surface of a clutch pulley according to a an action of the field core assembly and a hub connected to a driving shaft of the compressor.

The friction surface of the clutch pulley has a number of banana slots to induce a flow of flux by the field core assembly, so that the disc is absorbed onto the friction surface of the clutch pulley.

Meanwhile, an edge region of the friction surface of the clutch pulley has a friction material inserting groove of a round form for bonding the friction material, so that rotary power of the clutch pulley is transferred to the disc by the friction force during absorption of the disc.

As well known, there is a method for bonding friction material to the clutch pulley. The bonding method includes the steps of: inserting a bonding sheet, which is made in such manner that nonwoven fabric is coated with epoxy resin, into the friction material inserting groove; attaching the ring-type friction material onto the bonding sheet; and bonding the friction material to the clutch pulley by high frequency induction hardening of epoxy resin.

In the above method, the bonding sheet being in a rolled state is unrolled to be provided. At this time, to minimize a waste amount of the bonding sheet, the bonding sheet is divided into three pieces at an angle of 120 degrees according to shapes of the ring-type friction material, and then arranged in the ring type, and inserted into the friction material inserting groove.

According to the above typical method, because an adhesive of an expensive sheet type is used and the bonding sheet is stamped in the form of an arch, non-stamped regions are all wasted, and it requires lots of material costs.

Furthermore, the typical method has several disadvantages in that it is difficult to divide the thin and light bonding sheet into several pieces of sheets by blanking, and complicated equipments cause higher error rate and deterioration of productivity.

If the bonding sheet stamped in the form of the arch is applied to other clutch pulley having a friction material inserting groove of different size, also molds or equipments of different type must be used, and so interchangeability of the equipments is lowered.

Furthermore, the typical method has bad influences on working environments as lots of dust is generated when epoxy resin of a solid phase coated on the nonwoven fabric is stamped.

Moreover, during absorbing the pieces of sheets by a transferring device in a vacuum condition and inserting the pieces of sheet into the friction material inserting groove, the bonding sheet is folded, missed or overlapped.

The nonwoven fabric of a rough surface prevents a smooth vacuum absorption of the pieces of sheet, and so, the pieces of sheets frequently drop down. Furthermore, there occurs an insertion error, such as deviation of the pieces of sheets from the correct position as they are not correctly inserted into the friction material inserting groove.

The insertion error causes a bonding error of the friction material, and thereby, durability of the clutch pulley is deteriorated. Because the friction material is arranged on the pieces of the bonding sheets after the pieces of the bonding sheets are inserted into the friction material inserting groove, only the bottom of the friction material is bonded to the clutch pulley. As the result, durability of the friction material is considerably lowered.

To solve the above problems, Korean Patent Publication discloses a method and a device for bonding friction material of clutch pulley.

In the prior art, the clutch pulley is moved by a transferring unit, which moves intermittently.

A valve, which has a nozzle such as a needle, is mounted at a predetermined position where the clutch pulley is stopped. The valve coats the friction material inserting groove with liquid phase adhesive of thermohardening while moving in a circumferential direction along the friction material inserting groove of the clutch pulley.

Meanwhile, in a state that the valve is fixed, the liquid phase adhesive can be coated from the valve to the friction material inserting groove during rotation of the clutch pulley.

The nozzle of the valve directs both side edges of the friction material inserting groove.

The clutch pulley coated with the liquid phase adhesive is transferred by the transferring unit to perform the next process, and then the friction material is inserted into the friction material inserting groove.

After that, in a state that the liquid phase adhesive is adhered on the bottom and both sides of the friction material, the liquid phase adhesive is hardened through a heating process and cooled to complete the bonding processes of the friction material.

However, the liquid phase adhesive of high viscosity requires a high-pressure pumping device to provide the liquid phase adhesive to the valve.

The limitation of the pumping device frequently incurs that the friction material inserting groove is coated with the liquid phase adhesive unevenly, and so there occurs the bonding error during insertion of the friction material into the friction material inserting groove.

To solve the above problem, it would be considered that inspectors manually check the coated condition of the liquid phase adhesive. However, in fact, it is difficult that the inspectors checks the coated condition of products one by one during a production line, and difficult to perform an exact inspection. After all, the typical method has a restriction in fundamentally preventing the bonding error.

Additionally, because the manual inspection takes lots of inspection period of time, the typical method lowers productivity of the products and increases the manufacturing cost due to a demand of manpower.

Korean Patent Publication No. 1999-34484 by the same inventor as the present invention discloses a method for bonding friction material using liquid phase adhesive. However, Korean Patent Publication No. 1999-34484 also has the same problems as the prior arts, and described only a preparing method without detail description of a friction device.

Therefore, the inventor of the present invention have repeatedly studied about device and method for effectively bonding friction material of a clutch pulley, and as the result, the present invention has been proposed.

DISCLOSURE OF INVENTION

Accordingly, the present invention is directed to a device and a method for bonding friction material of clutch pulley that substantially obviates one or more problems due to limitations and disadvantages of the related art.

An object of the present invention is to provide a device and a method for bonding friction material of clutch pulley, which can improve productivity and prevent bonding error of the friction material by automatically inspecting a coated condition of the liquid phase adhesive coated on a friction material inserting groove during a bonding process of friction material of the clutch pulley.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the device for bonding friction material of a clutch pulley includes: a transferring part for intermittently transferring a clutch pulley having a friction material inserting groove of a round shape, wherein friction material of a ring type is inserted into an end thereof; a dispenser unit having a nozzle for injecting a liquid phase adhesive to the friction material inserting groove of the clutch pulley; a vision inspector for sensing a coated condition of the liquid phase adhesive by the dispenser unit and for generating warning sound when the coated condition of the liquid phase adhesive is bad, the friction material inserting groove of the clutch pulley being coated with the liquid phase adhesive; a friction material inserting part for inserting the friction material into the friction material inserting groove of the clutch pulley coated with the liquid phase adhesive; and an induction heating part for inducting-heating and hardening the liquid phase adhesive while compressing the friction material so as to bond the friction material to the friction material inserting groove.

The vision inspector includes: a vision camera for sensing the coated condition of the liquid phase adhesive; a control unit for receiving sensing signal of the vision camera and comparing and determining the sensing signal with a set value; and a buzzer for generating warning sound according to output signal of the control unit when the control unit determines a coating error.

the vision inspector further includes a warning light lighted by output signal of the control unit when the control unit determines the coating error.

In another aspect of the present invention, the method for bonding friction material of clutch pulley includes the steps of: (S100) intermittently transferring a clutch pulley by a transferring part, the clutch pulley having a friction material inserting groove of a round shape wherein friction material is inserted into an end thereof; (S110) injecting and coating a liquid phase adhesive by a dispenser unit having a nozzle capable of injecting the liquid phase adhesive into the friction material inserting groove of the clutch pulley; (S120) sensing the coated condition of the liquid phase adhesive coating the friction material inserting groove of the clutch pulley and generating warning sound if the coated condition of the liquid phase adhesive is bad; (S150) inserting the friction material into the friction material inserting groove of the clutch pulley coated with the liquid phase adhesive by a friction material inserting part; and (S160) induction-heating and hardening the liquid phase adhesive by an induction heating part while compressing the friction material to bond the friction material to the friction material inserting groove.

In the coated condition inspecting step (S120), the friction material bonding method further includes a step (S130) of lighting a warning light at the same time when a vision inspector generates warning sound if the coated condition is bad.

The friction material bonding method further includes a step (S140) of manually correcting a bad coated region of the liquid phase adhesive coating the clutch pulley by a worker using a syringe for providing the liquid phase adhesive, when the worker recognizes the warning outputted from the vision inspector.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

Figure 1:
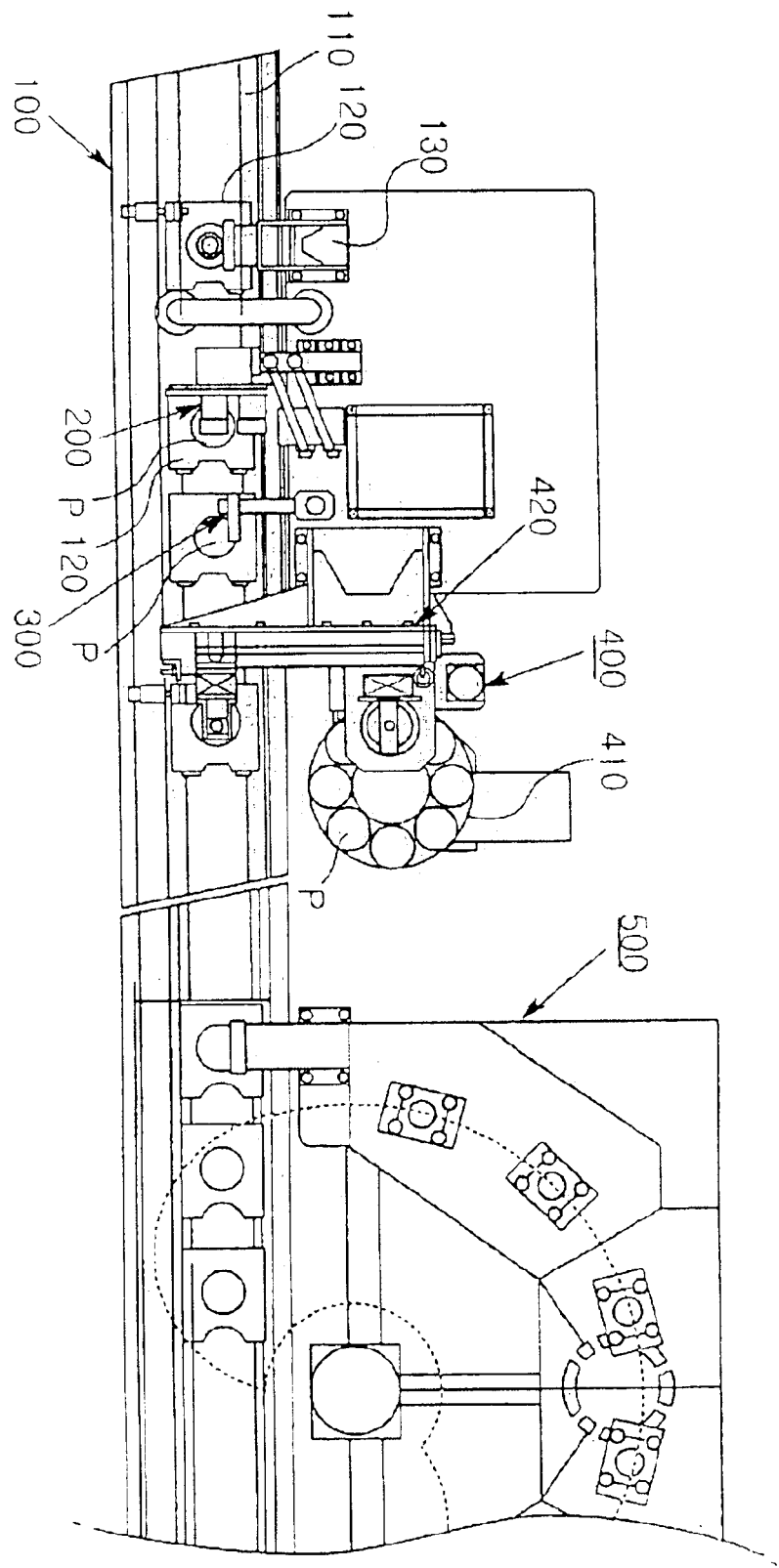
FIG. 1 is a plan view of a friction material bonding device of a clutch pulley according to the present invention.

The present invention will now be described in detail in connection with preferred embodiments with reference to the accompanying drawings. For reference, like reference characters designate corresponding parts throughout several views.

Figure 2:
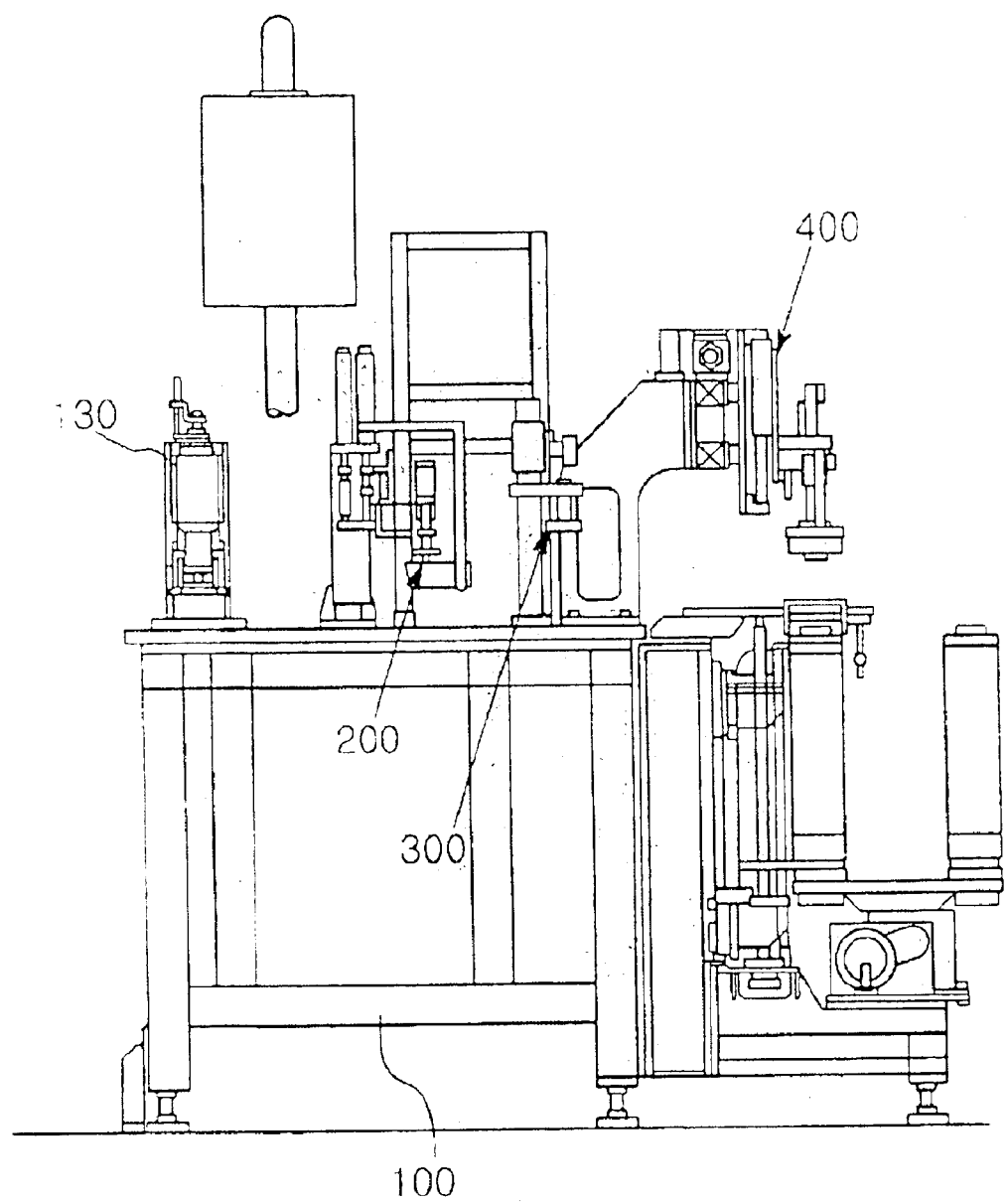
FIG. 2 is a front view of FIG. 1.
Figure 3:
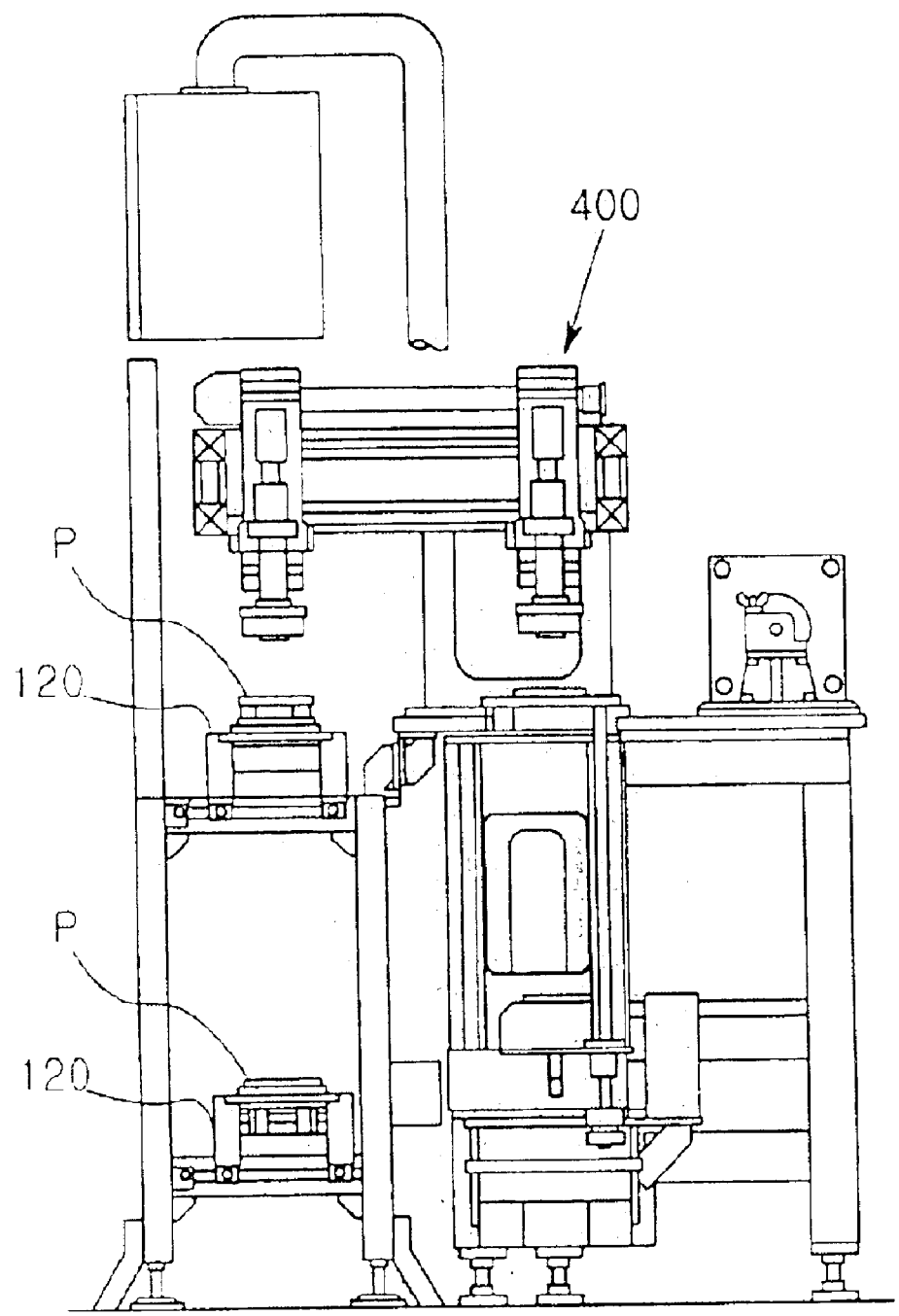
FIG. 3 is a right-side view of FIG. 1.

FIGS. 1 to 3 are brief views of a friction material bonding device of a clutch pulley according to the present invention.

The friction material bonding device according to the present invention includes: a transferring part 110 for intermittently transferring a clutch pulley P; a dispenser unit 200 for coating a friction material inserting groove G of the clutch pulley P with a liquid phase adhesive A; a friction material inserting part 400 for inserting friction material FM into the friction material inserting groove G of the clutch pulley P coated with the liquid phase adhesive A; and an induction heating part 500 for induction-heating and hardening the liquid phase adhesive A while compressing the friction material FM to bonding the friction material FM to the friction material inserting groove G.

The transferring part 110 is mounted in the form of a conveyer on the top of a frame 100 using well-known technical skill, and the clutch pulley P is transferred in a state that it is loaded on a pallet 120 intermittently transferred by the transferring part 110.

When the clutch pulley P is put on the pallet 120, an inspection device 130 first inspects the friction material inserting groove G.

The dispenser unit 200 is provided to coat the friction material inserting groove G of the clutch pulley P, which is put on the pallet 120 by the transferring part 110, with the liquid phase adhesive A.

Figure 6:
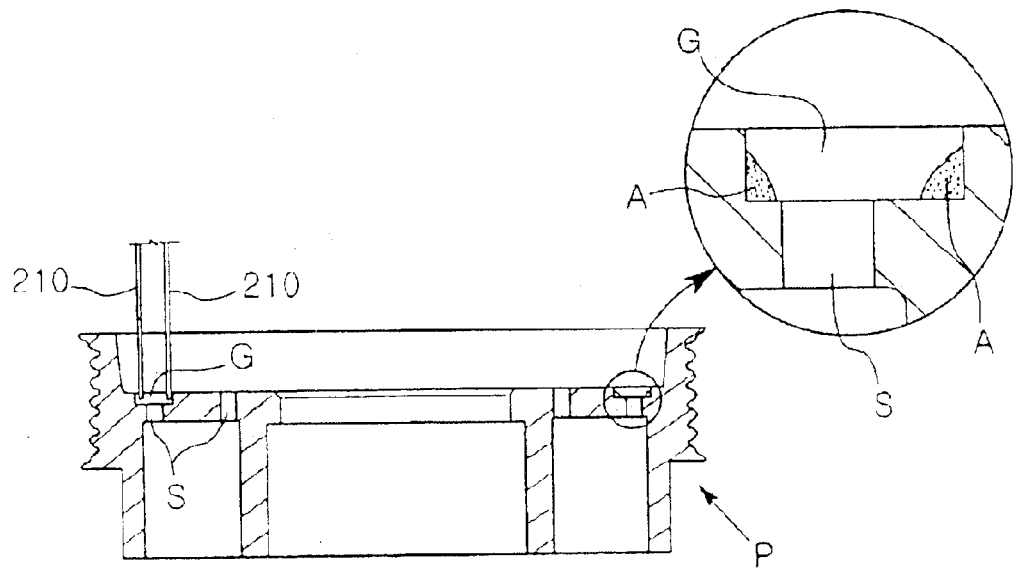
FIG. 6 is a sectional view showing a state that a friction material inserting grooves is coated with liquid phase adhesive by a dispenser unit before friction material is inserted and bonded into the friction material inserting groove of the clutch pulley.

As shown in FIG. 6, the dispenser unit 200 includes a nozzle 210 of a syringe type for easily coating both side edges of the friction material inserting groove G of the clutch pulley P.

Figure 5:
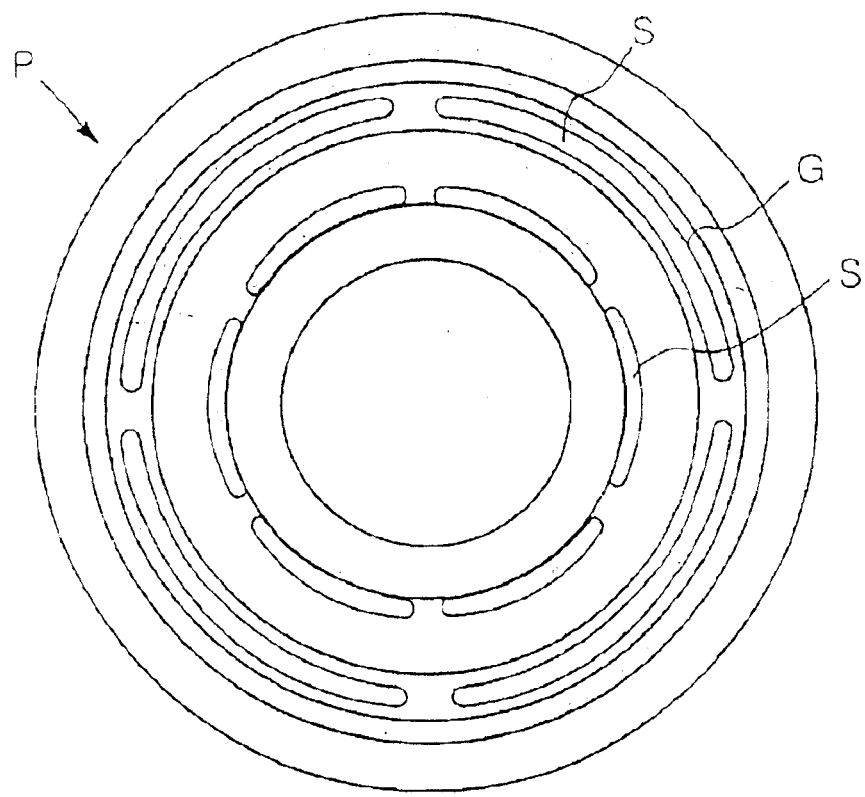
FIG. 5 is a plan view of the clutch pulley, in which friction material is inserted.

As shown in FIG. 5, a number of banana slots S are formed in the surface, where the friction material inserting groove G of the clutch pulley P is formed, for facilitating flow of flux.

As shown in FIG. 6, as a number of the banana slots S are also formed in the friction material inserting groove G, the both side edges of the friction material inserting groove G is coated with the liquid phase adhesive A to prevent the banana slots S from being coated with the liquid phase adhesive A.

A constant flow volume pump and a metering valve (not shown) are used so that the nozzle 210 of the dispenser unit 200 coats the friction material inserting groove G with the liquid phase adhesive A uniformly.

The constant flow volume pump and the metering valve are provided to exactly provide the liquid phase adhesive A, which is made of epoxy resin material having high viscosity of about 5,000,000 cps. Detailed description of the constant flow volume pump and the metering valve will be omitted as the adoption of them is well known.

To coat the round type friction material inserting groove G with the liquid phase adhesive A, a rotary unit (not shown) for rotating the clutch pulley P seated on the pallet 120 is mounted on the lower portion of the pallet 120.

When the rotary unit rotates the clutch pulley P while the nozzle 210 sprays the liquid phase adhesive A in closely contact with the both side edges of the friction material inserting groove G, the liquid phase adhesive A coats the both side edges of the friction material inserting groove G uniformly along the both side edges.

As another unit for coating the friction material inserting groove G with the liquid phase adhesive A, it would be appreciated that a robot operates the dispenser unit 200 so that the movement trace of the nozzle 210 is made along the friction material inserting groove G.

If the friction material FM is inserted and bonded into the friction material inserting groove G under a condition that the liquid phase adhesive A coating the friction material inserting groove G of the clutch pulley P by the dispenser unit 200 has a bad coating state, there occurs bonding error of the friction material FM.

To prevent the bonding error of the friction material FM, a vision inspector 300 is adopted to check the coated condition of the liquid phase adhesive A before the friction material bonding step.

The vision inspector 300 inspects the coated condition and generates warning sound to let workers know if there is the bad coated condition of the liquid phase adhesive A.

Figure 4:
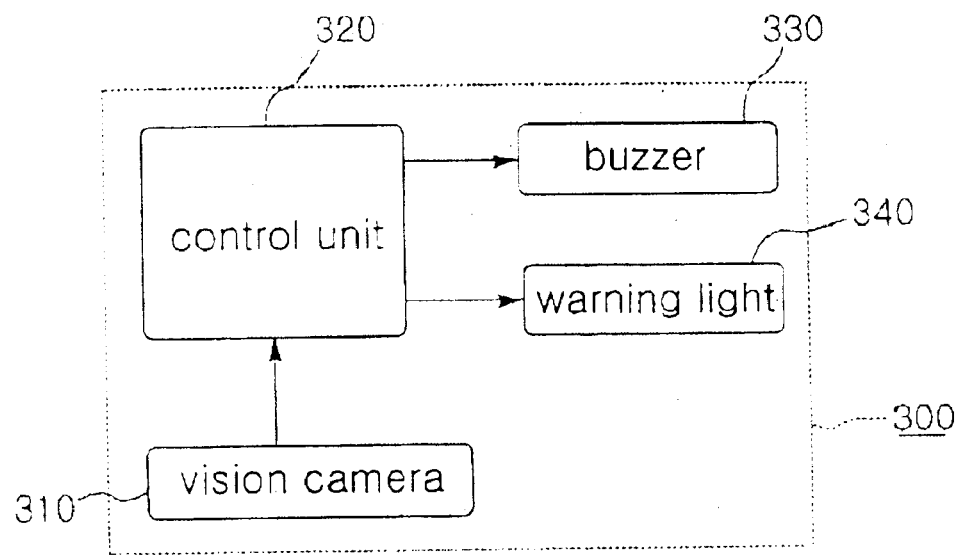
FIG. 4 is a block diagram showing a structure of a vision inspector according to the present invention.

FIG. 4 shows a detail structural view of the vision inspector 300.

That is, the vision inspector 300 includes a vision camera 310 for sensing the coated condition of the liquid phase adhesive A, a control unit 320 for receiving sensing signal of the vision camera 310 and comparing and determining the sensing signal with a set value, and a buzzer 330 for generating warning sound by output signal of the control unit 320 when the control unit 320 determines a coating error.

The vision inspector 300 further includes a warning light 340, which is lighted by the output signal of the control unit 320 when the control unit 320 determines the coating error.

Of course, the control unit 320 also outputs ling stop signal at the same time with output of warning signal.

By the above, the workers can easily recognize the bad coated condition of the liquid phase adhesive A through the warning by the buzzer 330 and the warning light 340, the workers can correct the bad coated region manually using an adhesive injector, and then, the line is normally operated again.

Therefore, the present invention can improve productivity and prevent bonding error of the friction material as it can automatically inspect the coated condition of the liquid phase adhesive A coated on the friction material inserting groove G during the bonding process of the friction material FM of the clutch pulley P.

The friction material inserting part 400 includes: a turn table 410 capable of rotation to arrange lots of the friction material FM in the form of a round; and a shifter 420 for unloading the friction material FM from the turn table 410 by a vacuum absorption and inserting the unloaded friction material FM into the friction material inserting groove G of the clutch pulley P when the clutch pulley P having the friction material inserting groove G well-coated with the liquid phase adhesive A.

The induction heating part 500 induction-heats the top of the clutch pulley P while compressing the top of the clutch pulley P in which the friction material is inserted by the friction material inserting part 400, so that the friction material FM is bonded on the friction material inserting groove G by high frequency induction hardening of the liquid phase adhesive A.

At this time, it is preferable that the induction heating is carried out by the steps of heating a friction material bonding portion at the temperature of 110° C.~180° C. while compressing the friction material FM at a pressure above 10 kgf, and stopping the heating and maintaining the compression for 9~15 seconds.

Figure 7:
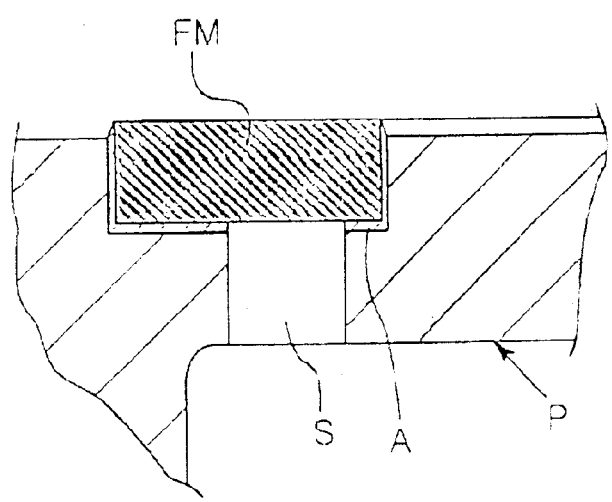
FIG. 7 is a partially sectional view showing a state that the friction material is inserted and bonded into the friction material inserting groove of the clutch pulley.

The liquid phase adhesive A is spread evenly on the contact surface between the friction material FM and the friction material inserting groove G when the friction material FM is compressed. Therefore, as shown in FIG. 7, three surfaces of the friction material FM, i.e., bottom surface, outer surface and inner surface, can be strongly bonded by an adhesive layer A1 formed on the friction material inserting groove G.

In general, in an aspect of features of the liquid phase adhesive A, conditions of the induction heating part 500 are set within a proper range as adhesive force of the friction material FM to the clutch pulley P becomes gradually higher if the heating temperature and compressing force are low and the compression maintaining period after heating is short within a predetermined range.

A method for bonding the friction material FM to the clutch pulley P by the friction material bonding device of the clutch pulley according to the present invention will be described.

Figure 8:
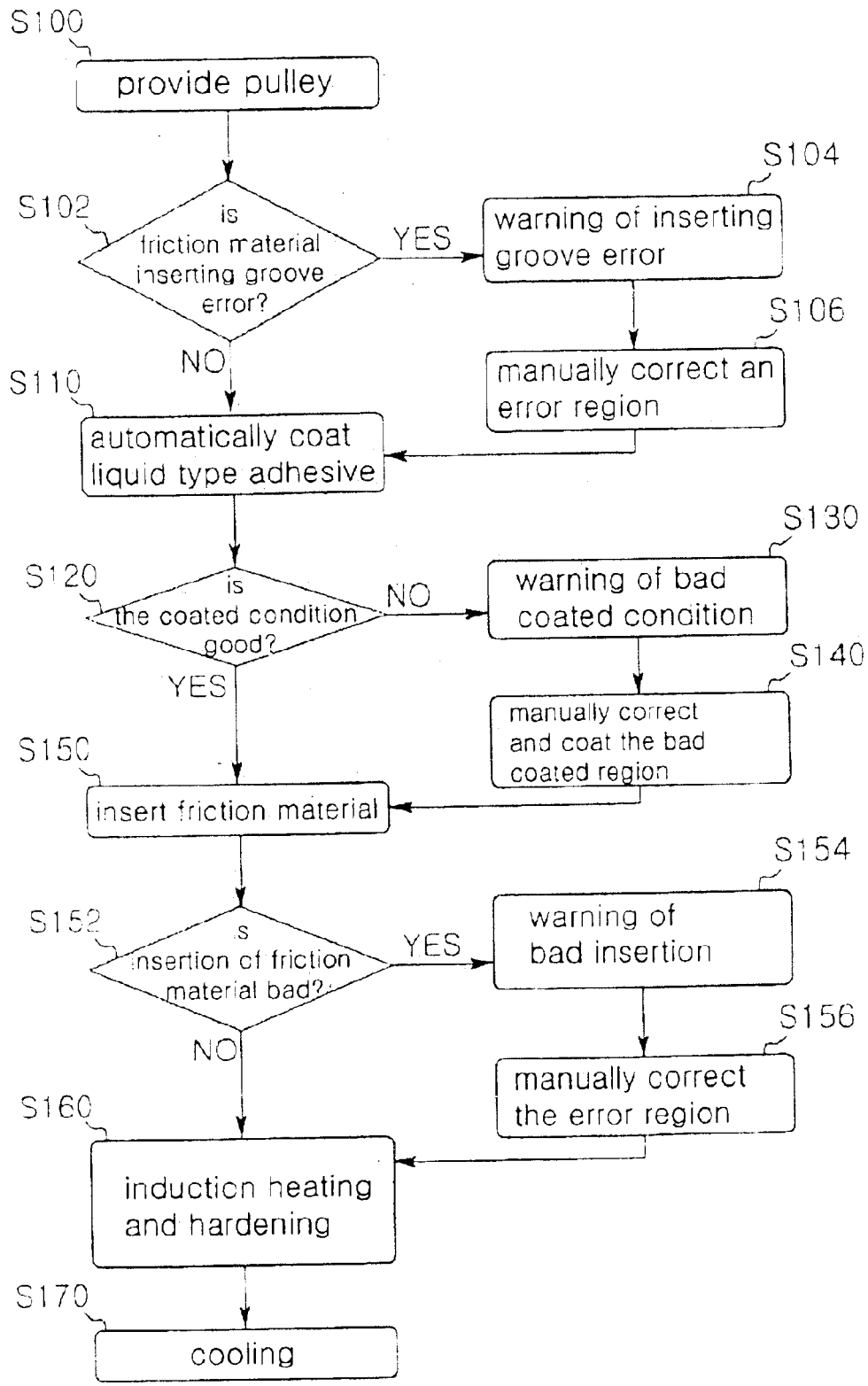
FIG. 8 is a flow chart showing a method for bonding friction material of the clutch pulley, which is carried out by the friction material bonding device of the clutch pulley according to the present invention.

As shown in FIG. 8, first, the clutch pulley P is seated on the pallet 120 in a state that the friction material inserting groove G directs upwardly (S100). Before the clutch pulley P is moved to the dispenser unit 200, the inspecting device 130 inspects whether or not there is any error of the friction material inserting groove G (S102).

If there is no error on the friction material inserting groove G, the transferring part 110 transfers the pallet 120, on which the clutch pulley P is seated, to the place where the dispenser unit 200 is mounted.

If there is any error on the friction material inserting groove G, the inspecting device 130 generates warning sound of the error (S104).

The line is stopped at the same time with the warning sound, and the worker goes to the corresponding place and immediately corrects the error of the friction material inserting groove G manually (S106).

When the correction is finished, the worker operates the line again, and the transferring part 110 transfers the pallet 120 to the upper part on which the dispenser unit 200 is mounted.

When the transfer of the pallet 120 at the place where the dispenser unit 200 is located is stopped, the dispenser unit 200 is moved to locate the nozzle 210 adjacent to the both side edges of the friction material inserting groove G. Then, the liquid phase adhesive A is sprayed from the nozzle 210, and the friction material inserting groove G is coated with the liquid phase adhesive A (S 110).

The above step can be carried out in such a manner that the rotary unit rotates the clutch pulley P seated on the pallet 120 or the robot operates the dispenser unit 200 to form the movement trace of the nozzle 210 along the friction material inserting groove G.

When the coating of the adhesive is finished, the transferring part 110 transfers the pallet 120 to the place where the vision inspector 300 is mounted.

When the pallet 120 is transferred to the place where the vision inspector 300 is mounted, the vision camera 310 of the vision inspector 300 inspects the coated condition of the liquid phase adhesive A coating the friction material inserting groove G.

When the sensing signal is inputted in the control unit 320, the control unit 320 compares the sensing signal with the set value (S120).

At this time, if the coated condition is good, the control unit 320 controls the transferring part 110 to transfer the pallet 120 to the place where the friction material inserting part 400 is mounted.

However, if the coated condition is bad, the control unit 320 outputs warning sound using the buzzer 330 and line stop signal, and if the warning light 340 is mounted, outputs also light signal for lighting the warning light 340.

When the worker recognizes the coating error of the liquid phase adhesive A through the warning of the buzzer 330 and the warning light 340, the worker goes to the corresponding place and immediately correct the coating error manually using the syringe for providing the liquid phase adhesive.

If the correction of the coating error is finished, the worker operates the line again, and the transferring part 110 transfers the pallet 120 to the place where the friction material inserting part 400 is mounted.

When the pallet 120 is transferred to the place where the friction material inserting part 400 is mounted, the turn table 410 rotates to fix the corresponding position, the shifter 420 unloads the friction material FM through the vacuum absorption and inserts the friction material FM into the friction material inserting groove G of the clutch pulley P coated with the liquid phase adhesive A (S150).

When the insertion of the friction material FM is finished, the vision inspector 300 inspects whether or not the insertion of the friction material FM is good (S152).

If the insertion of the friction material FM is good, the pallet 120 on which the clutch pulley P is seated is transferred to the induction heating part 500.

However, if the insertion of the friction material FM is bad, warning of the bad insertion of the friction material FM is outputted (S154).

Then, the worker goes to the corresponding place and corrects the bad insertion of the friction material FM manually.

When the correction is finished, the worker operates the line again, and the pallet 120 on which the clutch pulley P is seated is transferred to the induction heating part 500.

When the clutch pulley P that the friction material FM is inserted into the friction material inserting groove G is transferred to the induction heating part, the induction heating part compresses and heats the friction material FM (S160).

At this time, it is preferable that the friction material FM is compressed at the pressure of about 10 kgf or more, and the friction material contact part is heated at the temperature of 110° C.~180° C. by low frequency induction heating, and then compressed for 9~15 seconds without heating.

Through the compression and heating of the friction material FM, the liquid phase adhesive A can be hardened while being spread evenly on the contact surface between the friction material FM and the friction material inserting groove G. As the result, the three surfaces of the friction material FM, i.e., the bottom surface, outer surface and inner surface can be strongly bonded onto the friction material inserting groove G and form the adhesive layer.

As described above, when the induction heating is finished, the clutch pulley P is cooled at the room temperature of about 25° C. (S170). The cooling can be carried out by providing cooling air.

Finally, the bonded strength of the friction material FM is checked.

Industrial Applicability

As described above, the present invention can automatically inspect the coated condition of the liquid phase adhesive A before the friction material FM is inserted into the friction material inserting groove G, thereby preventing the clutch pulley P badly coated with the liquid phase adhesive A from progressing to the friction material inserting step.

The present invention can improve productivity and manufacture the clutch pulley P of high quality without error as it can prevent the bonding error of the friction material FM.

Furthermore, the present invention can improve productivity and reduce the manufacturing cost as the coated condition of the liquid phase adhesive A is automatically inspected by the vision inspector 300 as well as the worker's manual inspection While the present invention has been described with reference to the particular illustrative embodiments, it is not to be restricted by the embodiments but only by the appended claims.

It is to be appreciated that those skilled in the art can change or modify the embodiments without departing from the scope and spirit of the present invention.

Therefore, it is to be appreciated that all modifications and amendments of the present invention belong to the scope of the present invention.

What is claimed is:

1. A device for bonding friction material to a clutch pulley, the friction material bonding device comprising:

a transferring part for intermittently transferring a clutch pulley having a friction material inserting groove of a round shape, wherein friction material of a ring type is inserted into an end thereof;

a dispenser unit having a nozzle for injecting a liquid phase adhesive to the friction material inserting groove of the clutch pulley;

a vision inspector for sensing a coated amount of the liquid phase adhesive on the friction material inserting groove of the clutch pulley by the dispenser unit and for generating a warning sound when the liquid phase adhesive is not uniformly coated over the friction material inserting groove;

a friction material inserting part for inserting the friction material into the friction material inserting groove of the clutch pulley coated with the liquid phase adhesive; and an induction heating part for inducting-heating and hardening the liquid phase adhesive while compressing the friction material so as to bond the friction material to the friction material inserting groove.

2. The device for bonding friction material of clutch pulley according to claim 1, wherein the vision inspector comprises:

a vision camera for sensing the coated condition of the liquid phase adhesive;

a control unit for receiving a sensing signal of the vision camera and comparing and determining the sensing signal with a set value; and a buzzer for generating warning sound according to output signal of the control unit when the control unit determines a coating error.

3. The device for bonding friction material of clutch pulley according to claim 2, wherein the vision inspector further comprises a warning light lighted by output signal of the control unit when the control unit determines the coating error.

* * * * *